United States Patent
Yu

(10) Patent No.: US 9,435,911 B2
(45) Date of Patent: Sep. 6, 2016

(54) VISUAL-BASED OBSTACLE DETECTION METHOD AND APPARATUS FOR MOBILE ROBOT

(71) Applicant: SHENZHEN MERCURY OPTOELECTRONICS RESEARCH INSTITUTE, Shenzhen (CN)

(72) Inventor: Shuda Yu, Shenzhen (CN)

(73) Assignee: SHENZHEN MERCURY OPTOELECTRONICS RESEARCH INSTITUTE, Shenzhen (CN)

( * ) Notice: Subject to any disclaimer, the term of this patent is extended or adjusted under 35 U.S.C. 154(b) by 0 days.

(21) Appl. No.: 14/699,165

(22) Filed: Apr. 29, 2015

(65) Prior Publication Data

US 2015/0314443 A1 Nov. 5, 2015

(30) Foreign Application Priority Data

Apr. 30, 2014 (CN) .......................... 2014 1 0182735

(51) Int. Cl.
*G01V 8/10* (2006.01)
*B25J 9/16* (2006.01)
*G05D 1/02* (2006.01)

(52) U.S. Cl.
CPC ................ *G01V 8/10* (2013.01); *B25J 9/1666* (2013.01); *B25J 9/1697* (2013.01); *G05D 1/0214* (2013.01); *G05D 1/0246* (2013.01); *G05B 2219/39082* (2013.01); *G05B 2219/40519* (2013.01); *Y10S 901/01* (2013.01)

(58) Field of Classification Search
CPC ... B25J 9/1666; B25J 9/1697; G05D 1/0214; G05D 1/0246; G05B 2219/39082; G05B 2219/40519; Y10S 901/01
USPC .......................................................... 701/28
See application file for complete search history.

(56) References Cited

U.S. PATENT DOCUMENTS

| | | | | |
|---|---|---|---|---|
| 2010/0034422 A1* | 2/2010 | James | .................. | G06T 7/2033 382/103 |
| 2012/0197439 A1* | 8/2012 | Wang | .................... | B25J 9/1689 700/259 |
| 2013/0204430 A1* | 8/2013 | Davey | ................. | G06F 19/3456 700/216 |
| 2013/0223673 A1* | 8/2013 | Davis | ....................... | G06K 9/78 382/100 |
| 2014/0052555 A1* | 2/2014 | MacIntosh | ........... | G06Q 20/208 705/23 |
| 2014/0267614 A1* | 9/2014 | Ding | .................. | H04N 13/0275 348/46 |

OTHER PUBLICATIONS

"Saliency detection and model-based tracking: a two part vision system for small robot navigation in forested environment" Richard Roberts ; Duy-Nguyen Ta ; Julian Straub ; Kyel Ok ; Frank Dellaert Proc. SPIE 8387, Unmanned Systems Technology XIV, 83870S (May 1, 2012); doi:10.1117/12.919598.*

* cited by examiner

*Primary Examiner* — McDieunel Marc
*Assistant Examiner* — James E Stroud
(74) *Attorney, Agent, or Firm* — Anova Law Group, PLLC

(57) ABSTRACT

A visual-based obstacle detection method is provided. The method includes receiving image information of an environment containing a mobile robot captured by at least one visual sensor to obtain one of a three-dimensional space and a two-dimensional plane, and extracting and matching feature geometric primitives based on the received image information. The method also includes reconstructing coordinates of matched extracted feature geometric primitives and positions and orientations of the visual sensor and optimizing the reconstructed coordinates to obtain a calculation result, wherein the calculation result includes the feature geometric primitives, the positions and orientations of the visual sensor, as well as visible constraint relationships between the feature geometric primitives and the positions and orientations. Further, the method includes detecting obstacles in the environment containing the mobile robot based on the obtained calculation result and plotting a path for automatic motion of the mobile robot based on the detected obstacles.

18 Claims, 8 Drawing Sheets

VISUAL-BASED OBSTACLE DETECTION METHOD AND APPARATUS FOR MOBILE ROBOT

CROSS-REFERENCES TO RELATED APPLICATIONS

This application claims priority of Chinese Application No. 201410182735.0 filed on Apr. 30, 2014, the entire contents of all of which are hereby incorporated by reference.

FIELD OF THE INVENTION

The present disclosure generally relates to the field of robot control technologies and, more particularly, relates to visual-based obstacle detection methods and apparatuses for mobile robots.

BACKGROUND

Currently, autonomous mobile robot is a rapidly developing branch of robotics, and attracts great attention in both research and industry fields. The automatic motion of the autonomous mobile robot is a cyclical automatic process. For each cycle, the autonomous mobile robot first determines which, in the external space, are obstacles and which are free space and then designs a path in the free space. Further, the autonomous mobile robot plans its motion command based on the designed path and completes the motion.

In existing technologies, most obstacle detection methods mainly depend on active sensors such as laser or sonar sensors. However, these detection methods may have characteristics such as low anti-interference ability and high cost. Because visual sensors have characteristics such as small size, low cost and high anti-interference ability, a few detection methods also use visual sensors to detect the obstacles.

In existing visual-based obstacle detection methods for a mobile robot, the mobile robot calculates parallax of two images based on the images obtained by a left camera and a right camera, derives distances of scene objects relative to the robot based on the parallax, and then defines the free space and the obstacles. However, these methods are only limited to the binocular camera. Also, because the parallax of the images needs to be calculated and grid storage needs to be used to store obstacle information, the computation is complex and real-time reaction capability is poor. For methods using a monocular camera, motion compensation is used to detect the obstacles. However, these methods can only be used to detect the obstacles on a road surface, and the scope of its application is only limited to planar motion of the robot, not suitable for space motion.

The disclosed methods and apparatuses are directed to solve one or more problems set forth above and other problems. For example, the disclosed methods and apparatuses can provide technical solutions for detecting obstacles in both a two-dimensional (2D) plane and a three-dimensional (3D) space. The disclosed methods may be applied to any visual-based obstacle detection scene in both the 2D plane and the 3D space.

BRIEF SUMMARY OF THE DISCLOSURE

One aspect of the present disclosure includes a visual-based obstacle detection method. The method includes receiving image information of an environment containing a mobile robot captured by at least one visual sensor to obtain one of a three-dimensional (3D) space and a two-dimensional (2D) plane, and extracting and matching feature geometric primitives to obtain matched extracted feature geometric primitives based on the received image information. The method also includes reconstructing coordinates of the matched extracted feature geometric primitives and positions and orientations of the visual sensor and optimizing the reconstructed coordinates to obtain a calculation result, wherein the calculation result includes the matched extracted feature geometric primitives, the positions and orientations of the visual sensor, as well as visible constraint relationships between the matched extracted feature geometric primitives and the positions and orientations of the visual sensor. Further, the method includes detecting obstacles in the environment containing the mobile robot based on the obtained calculation result and plotting a path for automatic motion of the mobile robot based on the detected obstacles.

Another aspect of the present disclosure includes a visual-based obstacle detection apparatus. The apparatus includes a receiving module configured to receive image information of an environment containing a mobile robot captured by at least one visual sensor to obtain one of a three-dimensional (3D) space and a two-dimensional (2D) plane. The apparatus also includes a calculation module configured to calculate the image information received by the receiving module using Visual Simultaneous Localization and Mapping (Visual-SLAM) algorithm to obtain a calculation result, where the calculation result includes feature geometric primitives, positions and orientations of the visual sensor, and visible constraint relationships between the feature geometric primitives and the positions and orientations of the visual sensor. Further, the apparatus includes a processing module configured to, based on the obtained calculation result calculated by the calculation module, detect obstacles in the environment containing the mobile robot.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 13:
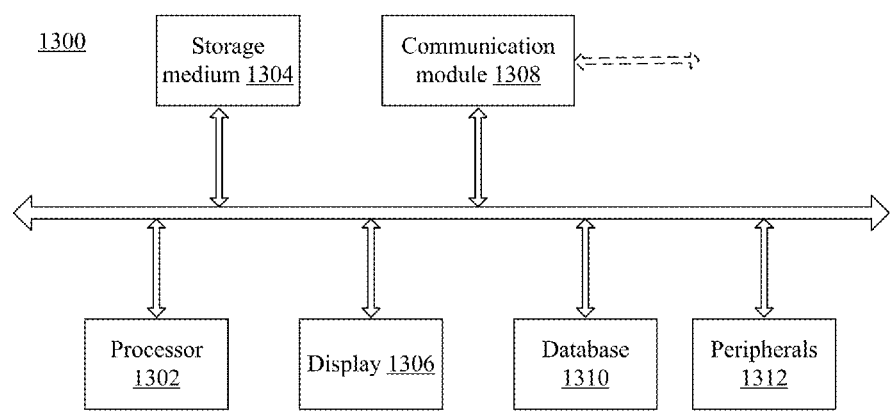
FIG. 13 illustrates an exemplary computing system consistent with the disclosed embodiments.

A visual-based obstacle detection apparatus may be implemented on any appropriate computing circuitry platform. FIG. 13 illustrates an exemplary computing system consistent with the disclosed embodiments. As shown in FIG. 13, the computing system 1300 may include a processor 1302, storage medium 1304, a display 1306, a communication module 1308, a database 1310, and peripherals 1312. Certain devices may be omitted and other devices may be included.

Processor 1302 may include any appropriate processor or processors. Further, processor 1302 can include multiple cores for multi-thread or parallel processing. Storage medium 1304 may include memory modules, such as ROM, RAM, flash memory modules, and mass storages, such as CD-ROM and hard disk, etc. Storage medium 1304 may store computer programs for implementing various processes, when the computer programs are executed by processor 1302.

Further, peripherals 1312 may include various sensors and other I/O devices, such as keyboard and mouse, and communication module 1308 may include certain network interface devices for establishing connections through communication networks. Database 1310 may include one or more databases for storing certain data and for performing certain operations on the stored data, such as visual-based obstacle detection.

Figure 1:
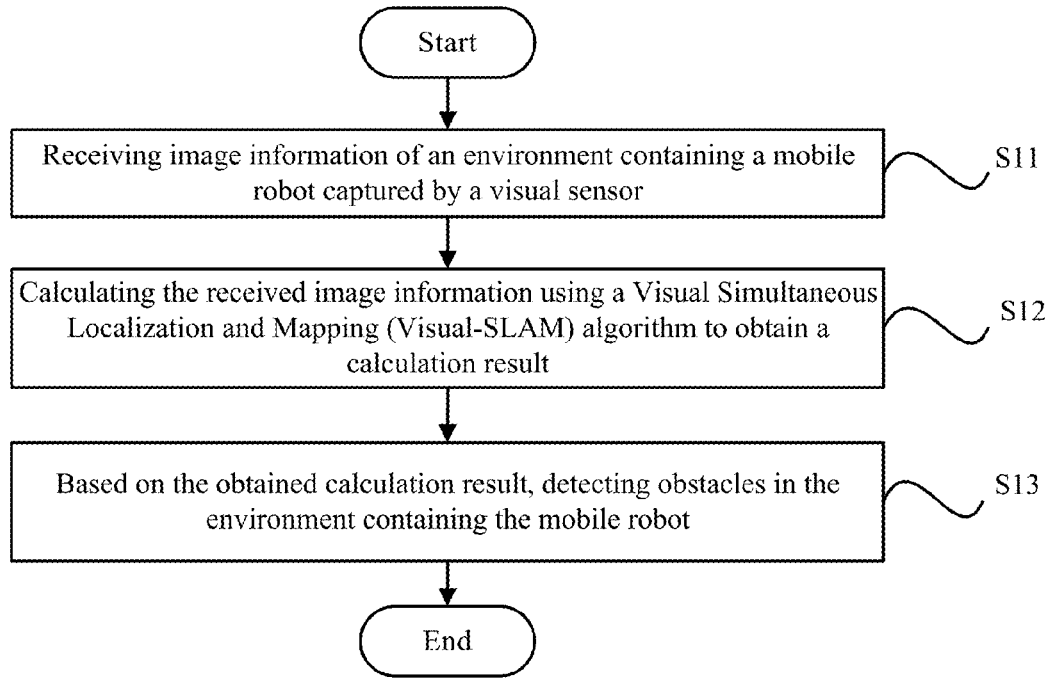
FIG. 1 illustrates a flow chart of an exemplary visual-based obstacle detection process for a mobile robot consistent with the disclosed embodiments.

FIG. 1 illustrates a flow chart of an exemplary visual-based obstacle detection process for a mobile robot consistent with the disclosed embodiments. As shown in FIG. 1, the obstacle detection process may include the following steps.

Step S11: image information of an environment containing a mobile robot captured by a visual sensor is received.

In one embodiment shown in FIG. 1 and the following embodiments, the entity for implementing the obstacle detection process may be an apparatus with an obstacle detection function, such as a mobile robot integrated with a module having the obstacle detection function.

Further, there is no limitation on the types of the visual sensor(s) that is used to capture the image information of the environment containing the mobile robot, as long as the visual sensor can help the mobile robot to identify the surroundings and take appropriate action. For example, the visual sensor may be a monocular camera, a binocular camera, a catadioptric omnidirectional camera, a multi-ocular omnidirectional camera, and so on. Specifically, when the visual sensor is used to capture the image information, the visual sensor can be installed and fixed on the mobile robot. The format of the image information captured by the visual sensor may be a group of continuous photos or a video.

Step S12: the received image information is calculated using a Visual Simultaneous Localization and Mapping (Visual-SLAM) algorithm to obtain a calculation result.

The Visual-SLAM algorithm is often used to locate a mobile robot. When locating the mobile robot, at first, the mobile robot captures in real-time the image information of the environment containing the mobile robot using the visual sensor installed and fixed on the mobile robot. Feature geometric primitives are extracted and matched from the captured image information. Then, a 3D reconstruction is performed for the matched extracted feature geometric points and the positions and orientations of the visual sensor. Finally, 3D spatial coordinates of the environment containing the mobile robot are obtained. Thus, the Visual-SLAM algorithm can be used to construct or update a map of an unknown environment while simultaneously keeping track of the mobile robot's location within the environment.

Figure 14:
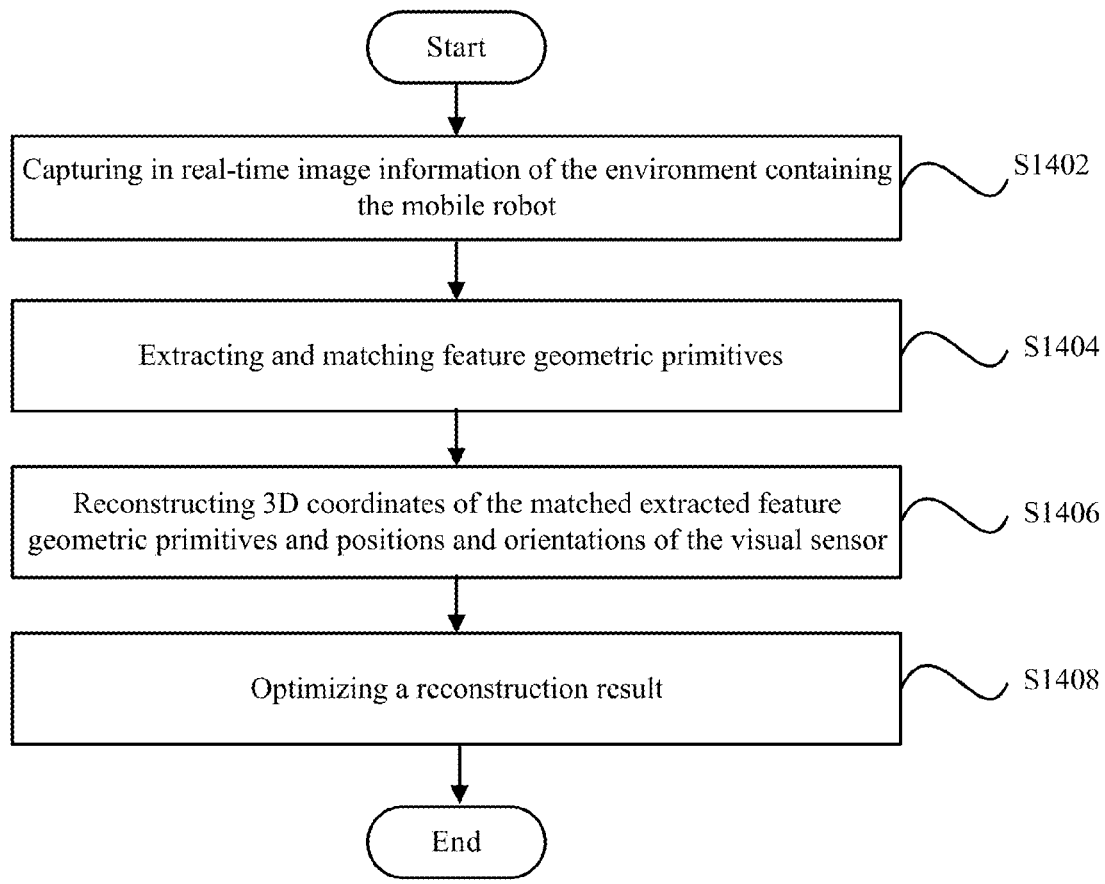
FIG. 14 illustrates a flow chart of an exemplary Visual Simultaneous Localization and Mapping (Visual-SLAM) algorithm for obstacle detection consistent with the disclosed embodiments.

Further, instead of or in addition to using the Visual-SLAM algorithm for the mobile robot localization, the Visual-SLAM algorithm can also be used for the obstacle detection. The image information received by the visual sensor is calculated and the obstacles in the environment containing the mobile robot are detected based on the calculation result. FIG. 14 illustrates a flow chart of an exemplary Visual-SLAM algorithm for obstacle detection consistent with the disclosed embodiments. As shown in FIG. 14, the process of performing Visual-SLAM algorithm for obstacle detection may include the following steps.

Step S1402: a mobile robot captures in real-time image information of the environment containing the mobile robot using a visual sensor (e.g., a camera) installed on the mobile robot. The format of the captured image information may be a group of continuous photos or a video.

Step S1404: based on the received image information, feature geometric primitives are extracted and matched. The feature geometric primitives may be feature geometric points, or feature geometric points and feature geometric line segments. The feature geometric primitives can be used to represent points, points and line segments in the 3D space of the environment containing the mobile robot. That is, the feature geometric point can be a point in the 3D space, and the feature geometric line segment can be a line segment in the 3D space.

Using the feature geometric points as an example, the process for extracting and matching the feature geometric points is described as follows. The points that are used as feature geometric primitives are called as feature geometric points. The feature geometric points may be pixel points which have certain difference from adjacent pixels in an image or a frame. A feature score of every pixel in the image is calculated, and a certain number (e.g., 500) of pixels with the highest feature score are selected. There are several methods for calculating the feature score of the pixels. For example, Laplacian-of-Gaussian (LoG) may be used to filter gray of an image; features from an Accelerated Segment Test (FAST) algorithm may be used to extract feature geometric points and later used to track and map objects.

Then, the feature geometric points extracted from the images at consecutive time points are matched. That is, for each feature geometric point p1 of an image I1 at a certain time point, the feature geometric points p2 corresponding to a same spatial point in an image I2 at the next time point may be searched. Specifically, for each feature geometric point p1 of an image I1, all feature geometric points are searched from the same area in the image I2. Based on a certain matching criteria, a matching score is calculated one by one. The feature geometric point(s) with the highest matching score may be selected as the matching feature geometric point(s) in the image I2. The matching criteria is to calculate sum of squared differences of the two feature geometric points, or calculate Zero-mean Normalized Cross Correlation of the two feature geometric points. If the calculated matching score is higher than a certain threshold, it indicates that the matching is successful.

Next, for the matched feature geometric points p2, the feature geometric points p3 in an image I3 at the next time point are searched, and so on. The searching process stops until there are no matched feature geometric points. Thus, multiple sets of matched feature geometric points can be obtained, where every set of matched feature geometric points includes all feature geometric points corresponding to a same spatial three-dimensional (3D) point in different images. The feature geometric points and feature geometric line segments may be processed similarly.

Position and orientation of a camera is the position coordinates and orientation information of a visual sensor (e.g., a camera) installed and fixed on a robot when the robot moves. The orientation information can be represented by a rotation matrix from a world coordinate system to the camera's own coordinate system at this time point. Every acquired image corresponds to a position and orientation of the camera. Every matched feature geometric point set corresponds to a point in the space, and such point is called as a reconstructed feature geometric point of the matched feature geometric point set. A matched feature geometric point can be seen as a projection of the reconstructed feature geometric point on the image. A visible relationship exists between the position and orientation of the camera which captures this image and this reconstructed feature geometric point. That is, if the reconstructed feature geometric point is captured on the image by the position and orientation of the camera, no obstacle exists between the reconstructed feature geometric point and the position and orientation of the camera; otherwise, the reconstructed feature geometric point cannot be captured by the position and orientation of the camera.

Step S1406: three-dimensional (3D) coordinates of the matched extracted feature geometric primitives and the positions and orientations of the visual sensor are reconstructed.

Specifically, an initial time point at which the robot starts moving is marked as t0, and the next time point is marked as t1. A position coordinate l0 of the position and orientation (c0) of the camera at t0 is set as an origin of the world coordinate system, and the rotation matrix R0 of c0 is an identity matrix. In fact, coordinates of all the calculated positions and orientations of the camera and the reconstructed feature geometric points are values relative to c0. At t1, after extracting and matching the feature geometric points, multiple sets of matched feature geometric points are obtained. Every matched feature geometric point set includes a feature geometric point at t0, and a matched feature geometric point at t1.

Based on the matched feature geometric point sets, c1 (a value relative to c0) can be calculated. Specifically, an intrinsic matrix of the camera is calibrated, where the intrinsic matrix of the camera is a matrix that converts the coordinates of the camera to the coordinates of the image. Images of a plane (e.g., a small blackboard with a checkerboard) at different positions and orientations are captured. The homography matrix of the plane and the image plane at each time point are calculated. Based on the calculated homography matrixes, constraint equations are obtained. Eigendecomposition is performed for a coefficient matrix of the equations and the intrinsic matrix of the camera is obtained by using a nonlinear optimization algorithm. Then, several groups of the feature geometric point sets are randomly selected and c1 is obtained using the calibrated intrinsic matrix of the camera.

Further, based on the positions and orientations of the camera and the matched feature geometric point set, 3D coordinates of all reconstructed feature geometric points are calculated by using trigonometry.

Assuming p0 and p1 are homogeneous representations of two-dimensional (2D) coordinates of the two feature geometric points corresponding to c0 and c1 on their own image, the 3D coordinates p'0 and p'1 at the world coordinate system can be calculated by:

$$p'0 = K^{-1} p0, \quad (1)$$

$$p'1 = R^{-1} K^{-1} p1 - l0, \quad (2)$$

where K is an intrinsic matrix of a visual sensor (e.g., a camera).

The positions of the camera at t0 and t1 are l0 and l1, respectively. d0 and d1 represent respectively vectors that pass through their own matched feature geometric points and use respectively the positions of the camera at t0 and t1 as the origins, where d0=p'0-l0, d1=p'1-l1.

The coordinates q at the world coordinate system of the reconstructed feature geometric points corresponding to the two matched feature geometric points can be calculated by:

$$q = (q0 + q1)/2 \quad (3)$$

where $$q0 = l0 + \alpha d0, \quad (4)$$

$$q1 = l1 + \beta d1, \quad (5)$$

$$\alpha = \frac{((t1 - t0) \cdot d1)(d0 \cdot d1) - ((t1 - 0) \cdot d0)\|d1\|^2}{(d0 \cdot d1)^2 - \|d0\|^2 \|d1\|^2}, \quad (6)$$

$$\beta = \frac{((t1 - t0) \cdot d0)(d0 \cdot d1) - ((t1 - 0) \cdot d1)\|d0\|^2}{(d0 \cdot d1)^2 - \|d0\|^2 \|d1\|^2} \quad (7)$$

By using the above method, the position and orientation of the camera and the 3D coordinates of the reconstructed feature geometric point at t1 are calculated. All positions and orientations of the camera and the 3D coordinates of the reconstructed feature geometric points can be obtained by using the same method for the following time points. When calculating the position and orientation of the camera and the 3D coordinates of the reconstructed feature geometric points, because the calculation result of the matching algorithm includes outlier matching pairs, the calculation result may include outliers and errors. Therefore, a robust expectation algorithm (e.g., Random Sample Consensus) can be used to increase the accuracy of the calculation.

Step S1408: the reconstructed 3D coordinates to obtain a calculation result are optimized, where the calculation result includes the feature geometric primitives, the positions and orientations of the visual sensor, as well as visible constraint relationships between the feature geometric primitives and the positions and orientations of the visual sensor.

In order to increase the accuracy of the calculation, the reconstructed 3D coordinates needs to be optimized. There are many optimization methods, such as, extended Kalman filter (EKF), particle swarm optimization (PSO), sparse bundle adjustment, and so on. For example, the sparse bundle adjustment is to obtain final positions and orientations of the camera and feature geometric points by performing multiple iterations for the calculated positions and orientations of the camera and the reconstructed feature geometric points.

After the reconstruction result is optimized, the calculation result may be obtained. The obtained 3D result may include the feature geometric primitives of the environment containing the mobile robot, the positions and orientations of the visual sensor, as well as visible constraint relationships between the feature geometric primitives and the positions and orientations of the visual sensor.

Further, the feature geometric primitives may include feature geometric points, as well as feature geometric points and feature geometric line segments, which can be used to represent points, points and line segments in a 3D space of the environment containing the mobile robot. That is, the feature geometric point may be a point in the 3D space, and the feature geometric line segment may be a line segment in the 3D space.

The positions and orientations of the visual sensor are used to represent position coordinates and orientation of the visual sensor installed on the mobile robot. All feature geometric primitives in the 3D space reconstructed based on the received image information can be calculated using the Visual-SLAM algorithm. For convenience of description, all feature geometric primitives included in the 3D space can be called as feature geometric primitives set Q.

In addition, the visible constraint relationship between the feature geometric primitive and the position and orientation of the visual sensor is used to represent whether a space between certain feature geometric primitive and the position and orientation of the visual sensor is visible. If the space is visible, it indicates that there are no obstacles between the certain feature geometric primitive and the visual sensor. Based on the received image information, all visible constraint relationships between the feature geometric primitives set Q and the positions and orientations of the visual sensor in the 3D space containing the mobile robot can be calculated.

It should be noted that the feature geometric primitives extraction and matching, 3D reconstruction of the feature geometric primitives and the positions and orientations of the visual sensor, and optimization of the reconstruction result can use any of the existing methods, details of which are not repeated herein.

Returning to FIG. 1, after Step S12, the process goes to Step S13.

Step S13: based on the calculation result, the obstacles in the environment containing the mobile robot are detected. When Step S13 is performed, based on the calculation result obtained in Step S12, the obstacles in the environment containing the mobile robot are detected.

Because the image information received by the visual sensor is calculated using the Visual-SLAM algorithm, and the obstacles in the environment containing the mobile robot can be directly detected based on the obtained calculation result, the computation is relatively simple comparing to traditional obstacle detection methods. Second, because the mobile robot's moving space is not restricted, the obstacle detection process can be applied to both 3D spatial movement and 2D planar movement. The mobile robot's moving space refers to the space for a mobile robot moving on the 3D or 2D environment. Also, when the image information of the environment is captured using this obstacle detection process, the type of the visual sensor is not restricted.

Figure 2:
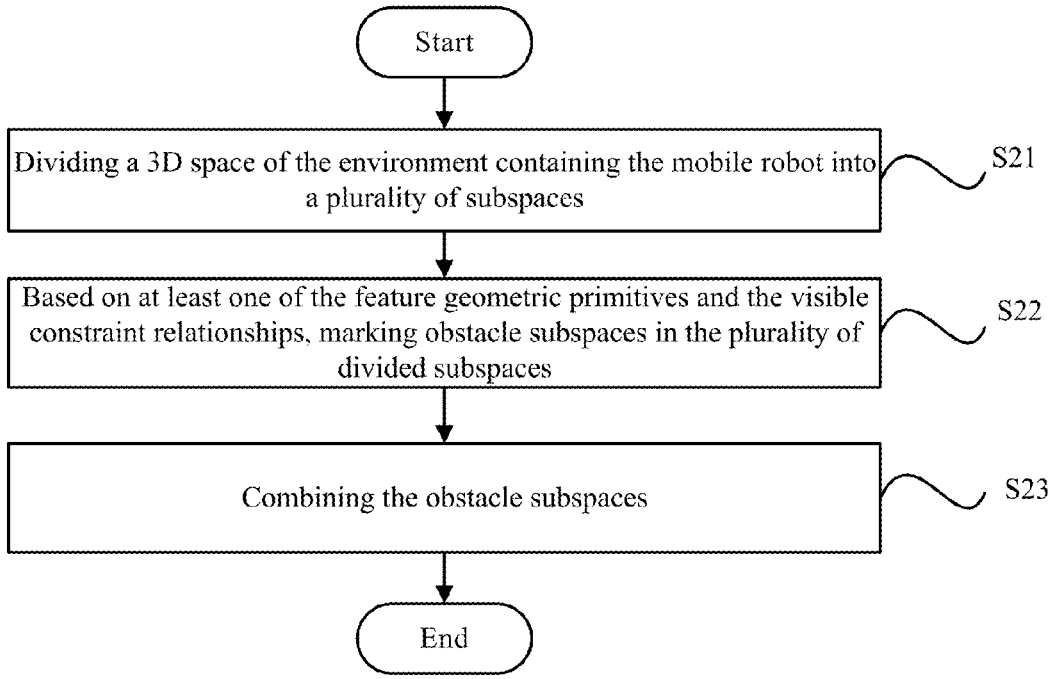
FIG. 2 illustrates a flow chart of an exemplary process of Step S13 shown in FIG. 1 consistent with the disclosed embodiments.

FIG. 2 illustrates a flow chart of an exemplary process of Step S13 shown in FIG. 1 consistent with the disclosed embodiments. As shown in FIG. 2, the process may include the following steps.

Step S21: a 3D space of the environment containing the mobile robot is divided into a plurality of subspaces using a regular grid format.

Figure 3:
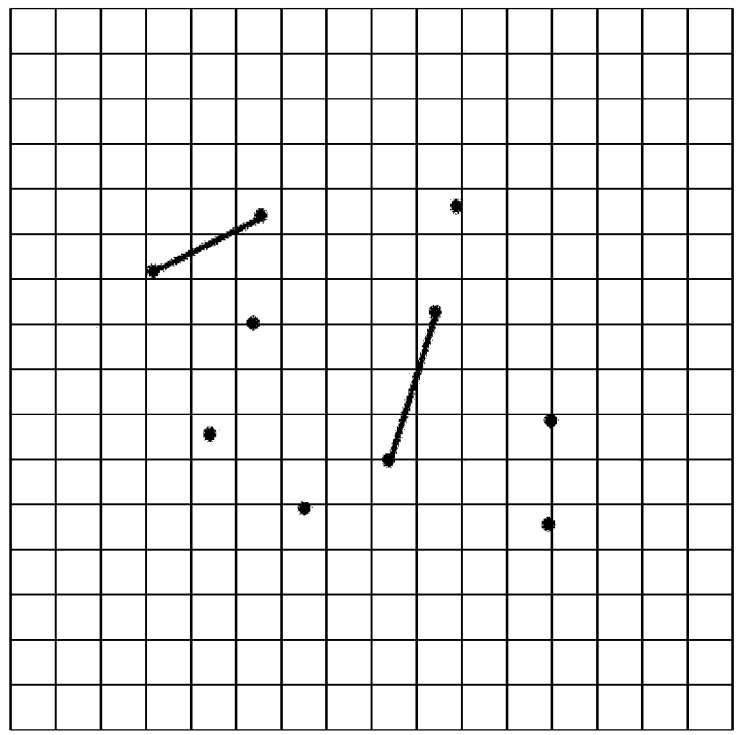
FIG. 3 illustrates a schematic diagram of an exemplary regular grid consistent with the disclosed embodiments.

When the 3D space is divided, a regular grid structure or an irregular combination structure can be used to divide the 3D space. FIG. 3 illustrates a schematic diagram of an exemplary 3D space division using the regular grid structure consistent with the disclosed embodiments.

As shown in FIG. 3, black dots and bold line segments represent feature geometric primitives. When the 3D space is divided using the regular grid format, two grid structures may be used: a uniform grid structure and a self-adaptive grid structure. The process for dividing the 3D space using the uniform grid structure and the self-adaptive grid structure are described in the followings.

When dividing the 3D space using the uniform grid structure, the 3D space is divided into a plurality of subspaces with a preset size. Thus, the 3D space of the environment containing the mobile robot is divided into a plurality of subspaces with a same size, e.g., multiple cuboid subspaces and/or cube subspaces. That is, the divided 3D space can be seen as a subspace set D including multiple cuboid subspaces and/or cube subspaces. As used herein, the preset size may be a product of the average value of the positions and orientations of the visual sensor and a constant.

When dividing the 3D space using the self-adaptive grid structure, the 3D space is divided into a plurality of subspaces with a same size. When the size of the divided subspace is still greater than a preset lower limit, and the divided subspace includes feature geometric primitives, the divided subspace is further divided; otherwise, the division of the subspace stops.

When the self-adaptive grids are created, the size of the smallest subspace (the lower limit) needs to be defined. Then, based on distribution of the feature geometric primitives, the 3D space is gradually divided into a plurality of subspaces with different sizes.

Specifically, the 3D space can be divided into n number of subspaces with the same size, n is an integer, such as n=2, 4, 8, and so on. For each subspace, when the size of the subspace is greater than the preset lower limit, whether the subspace includes at least one feature geometric primitive is determined. If the subspace includes at least one feature geometric primitive, the divided subspace is further divided into n number of subspaces with the same size. If the subspace does not include at least one feature geometric primitive, the division of the subspace stops. When the size of the subspace is less than or equal to the preset lower limit, the subspace is not further divided, and so on. The process continues to be performed until no subspace can be divided. The divided 3D space can be seen as a subspace set D including multiple cuboid subspaces and/or cube subspaces.

Returning to FIG. 2, after Step S21, the process goes to Step S22.

Step S22: based on the feature geometric primitives and/or the visible constraint relationships, obstacle subspaces in the divided subspaces are marked.

The 3D space is divided into subspaces using the regular grid format. The subspace that meets a first preset condition is marked as the obstacle subspace. The first preset condition may include: the subspace contains any feature geometric primitive, or the subspace does not contain the feature geometric primitive and the subspace has no intersection with any constraint primitive. The constraint primitive is the primitive constituted by the feature geometric primitive and the position and orientation of the visual sensor which has the visible constraint relationship with the feature geometric primitive.

That is, the constraint primitive is co-determined by the feature geometric primitive and the visible constraint relationship between the feature geometric primitive and the position and orientation of the visual sensor. For example, if the feature geometric primitive is a point, the constraint primitive constituted by the point and the position and orientation of the visual sensor that has the visible constraint relationship with the point is a line segment; if the feature geometric primitive is a line segment, the constraint primitive constituted by the line segment and the position and orientation of the visual sensor that has the visible constraint relationship with the line segment is a triangle.

After the 3D space is divided into subspaces using the uniform grid structure or the self-adaptive grid structure, the divided 3D space can be seen as a subspace set D including multiple cuboid subspaces and/or cube subspaces. For each subspace d in the subspace set D, if the subspace d includes the feature geometric primitive, the subspace d is marked as an obstacle subspace. When the subspace d does not include any feature geometric primitive, whether the subspace d is intersected with the constraint primitive is determined. If the subspace d is not intersected with any constraint primitive (that is, the subspace d has no intersection with any constraint primitive), the subspace d is marked as an obstacle subspace. If the subspace d is intersected with at least one constraint primitive, the subspace d is marked as a free subspace.

Step S23: the obstacle subspaces marked in Step S22 are combined.

After the obstacle subspaces are marked using the first preset condition, all the obstacle subspaces are combined into an obstacle space in the environment containing the mobile robot. All the free subspaces are combined, forming a free space in the environment containing the mobile robot. After the obstacle space and the free space are detected, the mobile robot can plan an appropriate moving path to complete autonomic movement.

Figure 4:
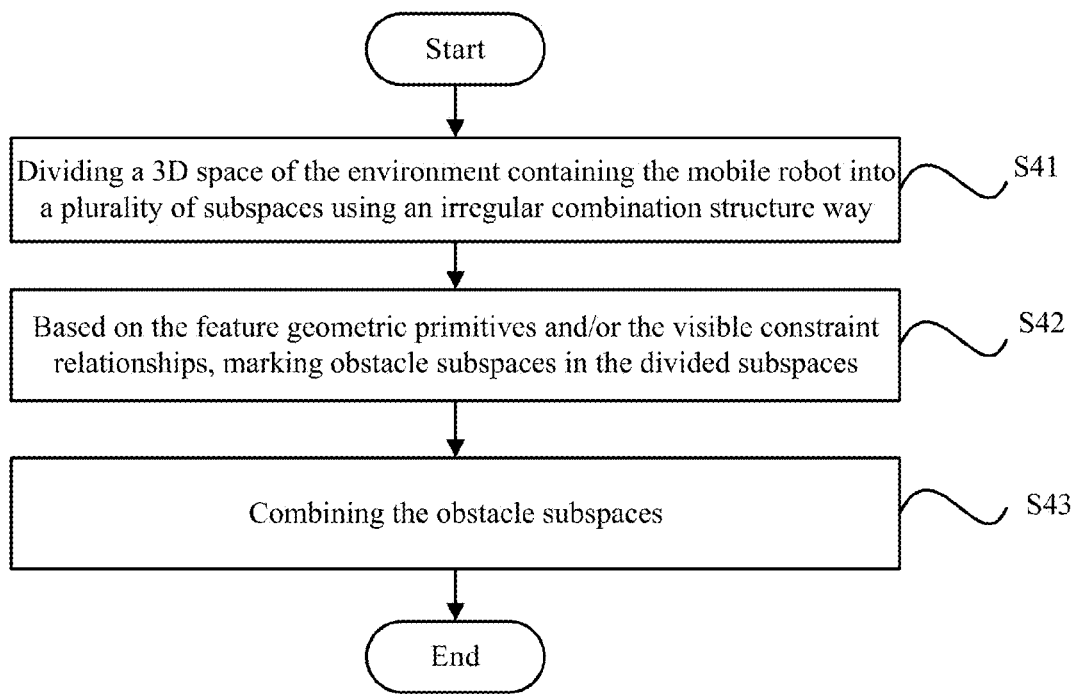
FIG. 4 illustrates a flow chart of another exemplary process of Step S13 shown in FIG. 1 consistent with the disclosed embodiments.

FIG. 4 illustrates a flow chart of another exemplary process of Step S13 shown in FIG. 1 consistent with the disclosed embodiments. As shown in FIG. 4, the process may include the following steps.

Step S41: a 3D space of the environment containing the mobile robot is divided into a plurality of subspaces using an irregular combination structure.

Figure 5:
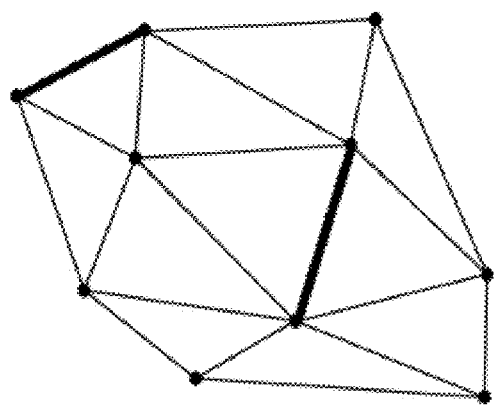
FIG. 5 illustrates a schematic diagram of an exemplary irregular combination structure consistent with the disclosed embodiments.

When the 3D space is divided, a regular grid structure or an irregular combination structure can be used to divide the 3D space. FIG. 5 illustrates a schematic diagram of an exemplary irregular combination structure consistent with the disclosed embodiments.

As shown in FIG. 5, black dots and bold line segments represent feature geometric primitives. When the 3D space is divided using the irregular combination structure, according to the types of the feature geometric primitives, there may include two structures to divide the 3D space:

1. When the feature geometric primitives calculated using the Visual-SLAM are points, the irregular combination structures are created by using the points as vertexes and the 3D space is divided into a plurality of irregular polyhedrons. That is, the divided 3D space can be seen as a subspace set D including multiple irregular polyhedrons.

2. When the feature geometric primitives calculated using the Visual-SLAM include points and line segments, the irregular combination structures are created by using the points as vertexes and using the line segments as edges, and the 3D space is divided into a plurality of irregular polyhedrons. That is, the divided 3D space can be seen as a subspace set D including multiple irregular polyhedrons.

Returning to FIG. 4, the process goes to Step S42.

Step S42: based on the feature geometric primitives and/or the visible constraint relationships, obstacle subspaces in the divided subspaces are marked.

The 3D space is divided into subspaces using the irregular combination structure. The subspace that meets a second preset condition is marked as the obstacle subspace. The second preset condition may include: the subspace has no intersection with any constraint primitive, where the constraint primitive is the primitive constituted by the feature geometric primitive and the position and orientation of the visual sensor which has the visible constraint relationship with the feature geometric primitive. That is, the constraint primitive is co-determined by the feature geometric primitive and the visible constraint relationship between the feature geometric primitive and the position and orientation of the visual sensor. For example, if the feature geometric primitive is a point, the constraint primitive constituted by the point and the position and orientation of the visual sensor that has the visible constraint relationship with the point is a line segment; if the feature geometric primitive is a line segment, the constraint primitive constituted by the line segment and the position and orientation of the visual sensor that has the visible constraint relationship with the line segment is a triangle.

After the 3D space is divided into subspaces using the irregular combination structure, the divided 3D space can be seen as a subspace set D including multiple irregular polyhedrons. For each subspace d in the subspace set D, if the subspace d is not intersected with all the constraint primitives, that is, the subspace d is not intersected with any constraint primitive, the subspace d is marked as an obstacle subspace. If the subspace d is intersected with at least one constraint primitive, the subspace d is marked as a free subspace.

Step S43: the obstacle subspaces marked in Step S22 are combined.

After the obstacle subspaces are marked using the second preset condition, all the obstacle subspaces are combined into an obstacle space in the environment containing the mobile robot. All the free subspaces are combined, forming a free space in the environment containing the mobile robot. After the obstacle space and free space are detected, the mobile robot can plan an appropriate moving path to complete autonomic movement.

Figure 6:
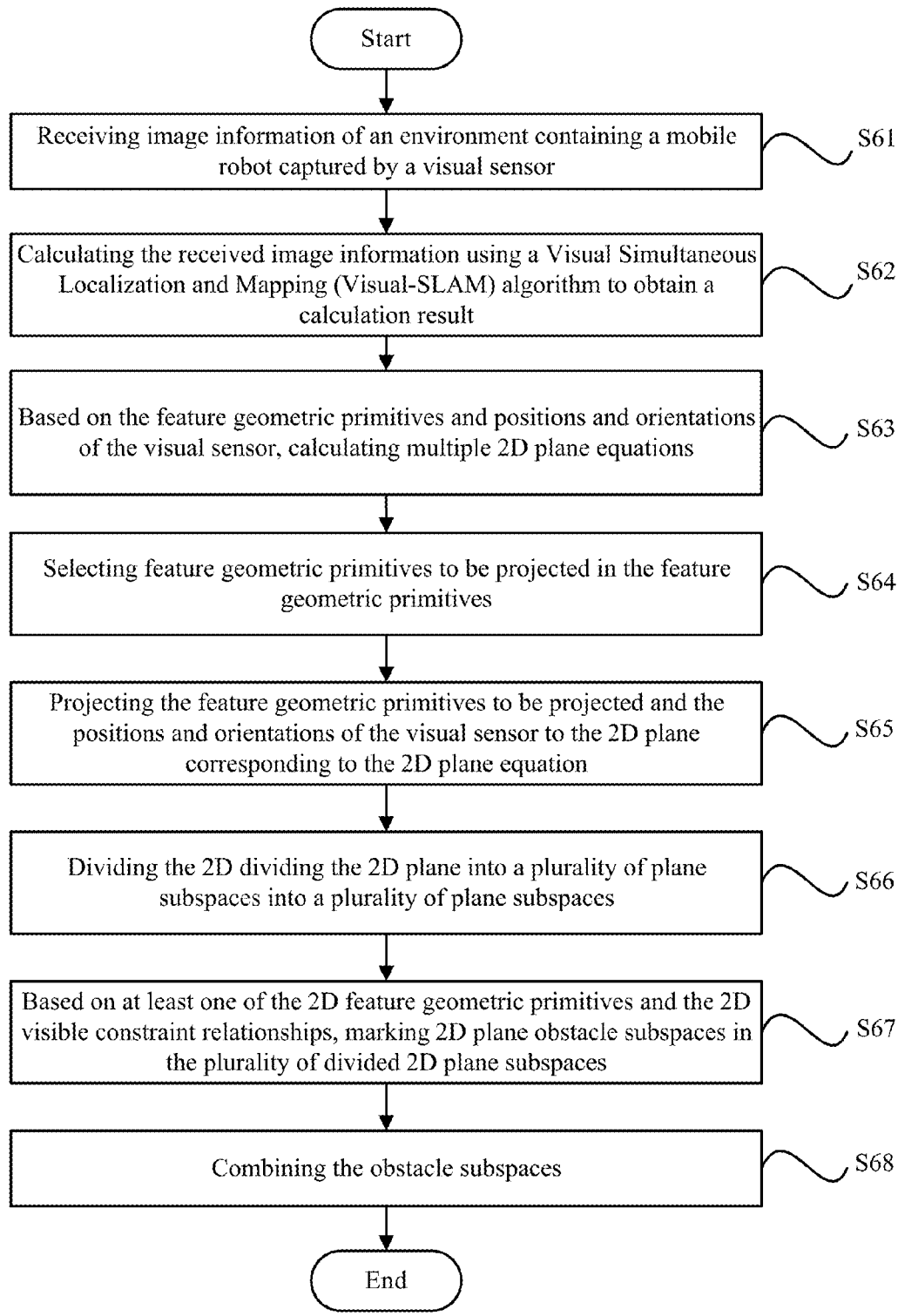
FIG. 6 illustrates a flow chart of another exemplary visual-based obstacle detection process for a mobile robot consistent with the disclosed embodiments.

When the motion of the mobile robot is limited in a 2D plane, in order to reduce computational complexity, another obstacle detection process may be used. This process is used in a scene that the mobile robot moves in a 2D plane. FIG. 6 illustrates a flow chart of another exemplary visual-based obstacle detection process for a mobile robot consistent with the disclosed embodiments. As shown in FIG. 6, the process may include the following steps.

Step S61: image information of the environment containing a mobile robot captured by a visual sensor is received. Step S61 is similar to Step S11 shown in FIG. 1, details of which are not repeated herein.

Step S62: the received image information is calculated using a Visual-SLAM algorithm to obtain a calculation result. Step S62 is similar to Step S12 shown in FIG. 1, details of which are not repeated herein.

Step S63: based on feature geometric primitives and positions and orientations of the visual sensor, multiple 2D plane equations are calculated, and a 2D plane equation is selected from the calculated 2D plane equations to determine a 2D plane.

Specifically, based on any three positions and orientations of the visual sensor, multiple 2D plane equations are calculated. Then, sum of squared distances between all the positions and orientations of the visual sensor and the 2D plane corresponding to each calculated 2D plane equation is calculated. The process for calculating multiple 2D plane equations and calculating sum of squared distances is repeatedly performed for many times, and multiple sums of squared distances are obtained. At last, the smallest sum of squared distance is selected from the multiple sums of squared distances, and the 2D plane equation corresponding to the smallest sum of squared distance is selected as a final 2D plane equation. The method for calculating the sum of squared distance can be one of existing calculation methods, details of which are not repeated herein. Of course, based on different types of the visual sensors, different methods for calculating the sum of squared distance may be selected.

Step S64: feature geometric primitives to be projected in the feature geometric primitives are selected.

Specifically, before projecting the feature geometric primitives to the 2D plane, the feature geometric primitives that need to be projected are selected (that is, not all the feature geometric primitives are projected to the 2D plane). The selection method is described as follows. A component value of the feature geometric primitive in a particular direction is calculated. If the component value is greater than a preset lower threshold and less than a preset upper threshold, the feature geometric primitive is projected to the 2D plane. The particular direction may be an upward direction which is perpendicular to the 2D plane.

Specifically, the method for selecting the feature geometric primitives to be projected is described in detail as follows.

At the beginning, a lower threshold e1 and an upper threshold e2 are set. Then, the feature geometric primitives are selected based on e1 and e2. Assuming that k is a vector toward the sky and perpendicular to the ground, for any feature geometric primitive, component values of all vertexes on k are calculated. If the component value of at least one vertex of the feature geometric primitive on k is less than e1 or greater than e2, the feature geometric primitive is not selected. The selection of the lower threshold e1 depends on error range of Visual-SLAM 3D reconstruction, such that most of the feature geometric primitives of the 2D plane are not selected. The lower threshold e1 may be set as a distance between the visual sensor and the 2D plane. The selection of the upper threshold e2 depends on whether the application scenario is in indoor or outdoor environment, such that the feature geometric primitives of the sky or the ceiling are not selected. For example, the upper threshold e2 may be set as n times of the distance between the visual sensor and the 2D plane.

Step S65: the feature geometric primitives to be projected and the positions and orientations of the visual sensor are projected to the 2D plane corresponding to the 2D plane equation to obtain 2D feature geometric primitives, 2D positions and orientations of the visual sensor, and 2D visible constraint relationships.

The selected the feature geometric primitives to be projected are projected to the 2D plane. That is, projection (also called as 2D feature geometric primitives) of the feature geometric primitives to be projected on the 2D plane is obtained. At the same time, because all positions and orientations of the visual sensor are also projected to the 2D plane, the projection (also called as 2D position and orientation of the visual sensor) of the positions and orientations of the visual sensor is obtained. Correspondingly, the constraint primitives corresponding to the feature geometric primitives are projected to the 2D plane, and visible constraint relationships (also called as 2D visible constraint relationships) between the 2D feature geometric primitives and the 2D positions and orientations of the visual sensor are further obtained. Correspondingly, the 2D constrain primitives are also obtained. The 2D constraint primitive is a primitive constituted by the 2D feature geometric primitive and the 2D position and orientation of the visual sensor that has the visible constraint relationship with the 2D feature geometric primitive.

Because feature geometric primitive and the position and orientation of the visual sensor are projected, when the 3D space is divided into multiple subspaces, Step S66 is performed.

Step S66: the 2D plane corresponding to the 2D plane equation calculated in Step S63 is divided into a plurality of subspaces.

The format for dividing the 2D plane into a plurality of subspaces is similar to the format for dividing the 3D space into a plurality of subspaces. That is, the 2D plane can be divided into a plurality of subspaces using the regular grid format or the irregular combination structure.

After the 2D plane is divided into a plurality of subspaces using the regular grid format (i.e., the uniform grid structure or the self-adaptive grid structure), the divided 2D plane can be seen as a plane subspace set including multiple squares and/or rectangles.

When the 2D plane is divided into a plurality of subspaces using the irregular combination structure, because the 2D feature geometric primitives include points, points and line segments, triangle division can be created by using the points as vertexes; or constraint triangle division can be created by using the points as vertexes and the line segments as edges. Then, the divided 2D plane can be seen as a plane subspace set including multiple irregular polygons.

Step S67: based on the 2D feature geometric primitives and/or the 2D visible constraint relationships, plane obstacle subspaces in the plane subspaces are marked.

When the 2D plane is divided using the regular grid format, the process for marking the plane obstacle subspaces is described in detail as follows. If a 2D plane subspace includes at least one 2D feature geometric primitive, the 2D plane subspace is marked as a plane obstacle subspace. If a 2D plane subspace does not include any 2D feature geometric primitive and the 2D plane subspace has no intersection with any 2D constraint primitive, the plane subspace is marked as a plane obstacle subspace; if the plane subspace is intersected with at least one 2D constraint primitive, the plane subspace is marked as a free plane subspace. The 2D constraint primitive may be constituted by the 2D feature geometric primitive and the position and orientation of the visual sensor which has visible constraint relationship with the 2D feature geometric primitive.

When the 2D plane is divided using the irregular combination structure, the process for marking the plane obstacle subspaces is described in detail as follows. If a 2D plane subspace is intersected with at least one 2D constraint primitive, the plane subspace is marked as a free plane subspace. If a 2D plane subspace is not intersected with any 2D constraint primitive, the plane subspace is marked as a plane obstacle subspace.

Step S68: the plane obstacle subspaces marked in Step S67 are combined.

Specifically, all plane subspaces that are marked as free plane subspaces are combined to form a free space of the 2D plane. All plane subspaces that are marked as plane obstacle subspaces are combined into an obstacle space of the 2D plane. Then, the mobile robot can plot a moving path in the free space of the 2D plane.

When the motion of the mobile robot is only limited in the 2D plane, the calculation result is projected to the 2D plane on which the mobile robot moves, and then the 2D plane is divided and the obstacles are marked. Therefore, the obstacles in the 2D plane are detected. Comparing to the division and obstacle detection of the 3D space, the computational complexity of this method is relatively low.

For the embodiments shown in FIGS. 1-6, when the mobile robot moves, no matter the mobile robot moves in a 3D space or on a 2D plane, the environment containing the mobile robot changes all the time. Therefore, the visual-based obstacle detection process is a real-time and cyclical process. As the environment containing the mobile robot changes, the corresponding calculation result is updated. Therefore, the updated free subspaces and the updated obstacle subspaces need to be marked based on the updated calculation result. When the updated free subspaces and the updated obstacle subspaces are marked, a global updating scheme and a continuous updating scheme may be used.

The process for the global updating scheme is described as follows. T1 and T2 are two adjacent time points. The updating does not depend on a calculation result at a previous time point T1, whereas a calculation result at a current time point T2 is directly used to re-divide and re-mark the environment containing the mobile robot, such that the updated free subspaces and the updated obstacle subspaces can be obtained and the obstacles in the environment containing the mobile robot at the current time point T2 can be detected. The amount of calculation needed by such global updating scheme increases gradually with time. Therefore, the real-time character of the method is not guaranteed.

The process for the continuous updating scheme is described as follows. T1 and T2 are two adjacent time points. A calculation result at a previous time point T1 is used for updating. A calculation result at a current time point T2 is compared to the calculation result of the previous time point T1, such that the updated calculation result of the current time point T2 and the changed subspaces are determined. The updated calculation result includes the updated feature geometric primitives, the updated positions and orientations of the visual sensor, and the updated visible constraint relationships. The changed subspaces may be subspaces with changed marking status, or subspaces with changed marking status and changed division status. When the changed subspaces are subspaces with changed marking status, based on the updated feature geometric primitives and/or the updated visible constraint relationships, the obstacle subspaces in the changed subspaces are marked again. When the changed subspaces are subspaces with changed marking status and changed division status, based on the updated feature geometric primitives and/or the updated visible constraint relationships, the changed subspaces are divided and marked again. When the continuous updating scheme is used, the needed time is basically not changed. Therefore, the real-time character of the method is ensured.

When the 3D space is divided using the regular grid format and the irregular combination structure, the continuous updating scheme may be different, details of which are described as follows.

1. The continuous updating scheme when the regular grid format is used to divide the 3D space.

When the uniform grid structure is used to divide the 3D space, during the moving process of the mobile robot, the divided subspaces do not change. That is, the division status of the subspaces is not changed. However, because the feature geometric primitives in the 3D space may change or increase, the visible constraint relationships may also be updated accordingly, and the marking status of the subspaces may also be changed. At this time, based on the updated feature geometric primitives and/or the updated visible constraint relationships, the obstacle subspaces in the divided subspaces are re-marked.

When the self-adaptive grid structure is used to divide the 3D space, it is assumed that T1 and T2 are two adjacent time points. From the previous time point T1 to the current time point T2, the feature geometric primitives are increased. That is, the feature geometric primitives are updated. Accordingly, the corresponding visible constraint relationships are also updated. In addition, whether the division status of the subspaces including the increased feature geometric primitives from the previous time point T1 to the current time point T2 is changed is determined. If it is determined that the division status the subspaces is changed, the changed subspaces need to be re-divided. Because the division status of the subspaces is changed, accordingly, the marking status of the subspaces is also changed. After the changed subspaces are re-divided, based on the updated feature geometric primitives and/or the updated visible constraint relationships, the obstacle subspaces in the re-divided subspaces are re-marked.

2. The continuous updating scheme when the irregular combination structure is used to divide the 3D space.

Specifically, it is assumed that T1 and T2 are two adjacent time points. $Q_{t1}$ is a set including all feature geometric primitives obtained by using the Visual-SLAM algorithm ending at T1, and $Q_{t2}$ is a set including all feature geometric primitives obtained by using the Visual-SLAM algorithm ending at T2. Because the division status and the marking status of the 3D space at T1 are known, the division status and the marking status of the subspaces at T2 may be changed. At this time, the division status and the marking status of the subspaces may need to be updated.

Because $Q_{t2}$ is a continuation of $Q_{t1}$, $Q_{t2}$ includes most of the feature geometric primitives in $Q_{t1}$. The feature geometric primitives that are not changed or are changed a little (such as, less than a threshold) from T1 to T2 are marked as Qo. The remaining feature geometric primitives in $Q_{t1}$ are outliers of the feature geometric primitives that are determined after beam adjustment and optimization, and such feature geometric primitives are marked as Qd. At the same time, some new feature geometric primitives at T2 are increased in $Q_{t2}$. These new feature geometric primitives are new feature geometric primitives that are reconstructed at T2, or the feature geometric primitives that have big 3D coordinate changes (such as, greater than a threshold) after beam adjustment and optimization. These two types of feature geometric primitives are marked as Qn. Qd and Qn constitute $Q_{t1}$; and Qn and Qo constitute $Q_{t2}$. The updating of the feature geometric primitives may be: removing the set Qd from the set at T2, and adding the set Qn in the remaining set.

It is assumed that a subspace set at T2 is {Do, Dn}, where Do is a subspace set that has no any change from T1 to T2, and Dn is a new subspace set. In addition, there are some subspaces which exist at T1, but not exist at T2, and such subspaces are marked as Dd (these subspaces can also be called as the destroyed subspaces at T2). The reason why these subspaces are destroyed is that after the new feature geometric primitive is added, if the new feature geometric primitive is in a certain subspace, then the subspace is destroyed, thus new vertexes and the destroyed vertexes are re-combined to form a new subspace. At this moment, Do and Dd form the subspace set at T1; and Do and Dn are combined to form the subspace set at T2.

It is defined that a function f(D, Q) is an intersection relation function of D and Q. It is assumed that D is a subspace set and Q is a feature geometric primitive set. f(D, Q) is a set of intersection relationships between all subspaces in D and all constraint primitives corresponding to the feature geometric primitives in Q. It is assumed that Q={qi|i=1 . . . n} is a set of feature geometric primitives; C={cj|j=1 . . . m} is a set of positions and orientations of the visual sensor; and V={vij|i∈1 . . . n, j∈1 . . . m} is a set of visible constraint relationships. vij represents that qi and cj are visible. According to previous description, a visible constraint relationship vij represents that a constraint relationship between a feature geometric primitive qi and the position and orientation of a visual sensor cj is visible. That is, no obstacle exists between qi and cj. A feature geometric primitive formed by using all vertexes of qi and cj as vertexes is a constraint primitive of qi. Every visible constraint relationship vij corresponds to a constraint primitive.

Figure 7:
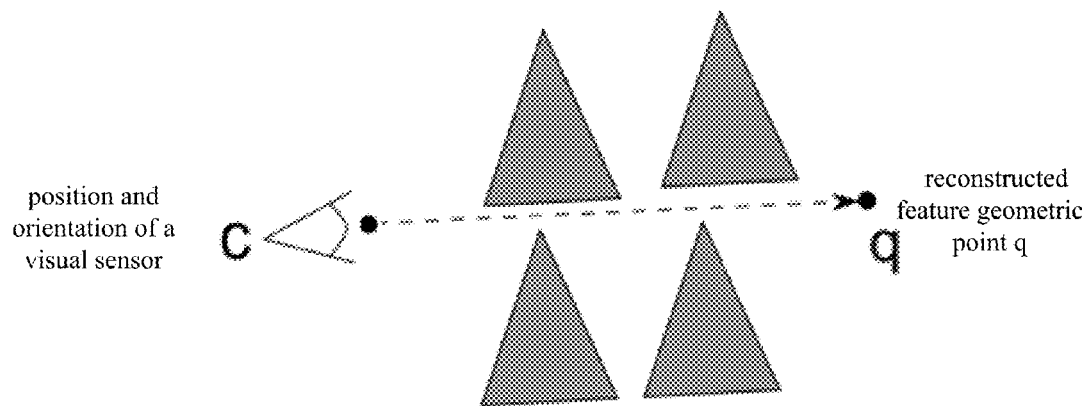
FIG. 7 illustrates a schematic diagram of an exemplary constraint primitive consistent with the disclosed embodiments.

FIG. 7 illustrates a schematic diagram of an exemplary constraint primitive consistent with the disclosed embodiments. As shown in FIG. 7, when qi is a feature geometric point, the constraint primitive of qi is a line segment that uses qi and cj as endpoints. Each grey triangle represents an obstacle. The line segment qicj has no intersection with any obstacle. That is, when the feature geometric primitive is a point (i.e., qi), the constraint primitive constituted by the point (i.e., qi) and the position and orientation (i.e., cj) of the visual sensor that has the visible constraint relationship with the point is a line segment (i.e., qicj).

Figure 8:
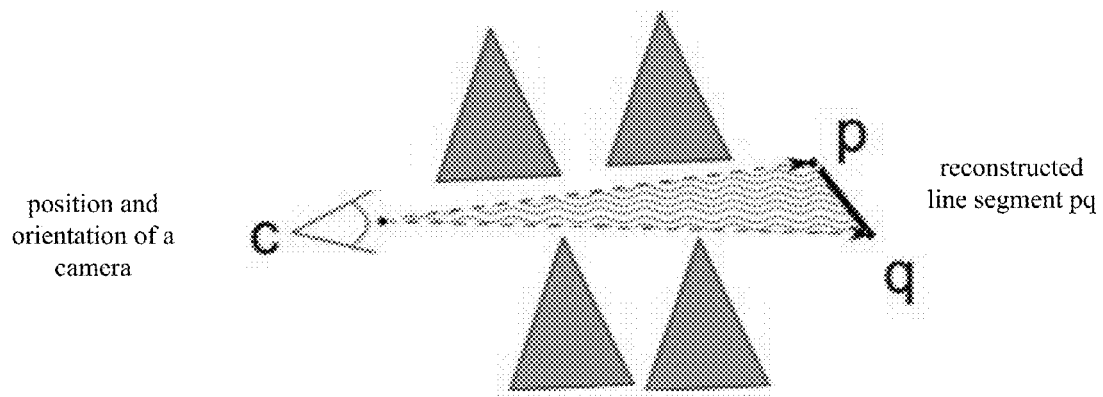
FIG. 8 illustrates a schematic diagram of another exemplary constraint primitive consistent with the disclosed embodiments.

FIG. 8 illustrates a schematic diagram of another exemplary constraint primitive consistent with the disclosed embodiments. As shown in FIG. 8, when piqi is a feature geometric line segment, the constraint primitive of piqi is a triangle using two endpoints of qi and cj as vertexes. Each grey triangle represents an obstacle. The triangle qicj has no intersection with any obstacle. That is, when the feature geometric primitive is a line segment (i.e., piqi), the constraint primitive constituted by the line segment (i.e., piqi) and the position and orientation (i.e., cj) of the visual sensor that has the visible constraint relationship with the line segment is a triangle (i.e., piqicj).

The space marking at T1 is known. That is, f(Do, Qo), f(Do, Qd), f(Dd, Qo), and f(Dd, Qd) are known. The mark of the free subspaces at T2 needs to be calculated. That is, f(Do, Qo), f(Do, Qn), f(Dn, Qo), f(Dn, Qn) need to be calculated, where f(Do, Qo) is known and does not need to be calculated.

The calculation of f(Dn, Qn) and f(Do, Qn) need to judge the visible constrain relationships between all constraint primitives corresponding to Qn and all subspaces at T2. The calculation can use a region growing method to reduce the complexity. For example, it is assumed that qi is any member of Qn, qi and the position and orientation of a visual sensor cj constitute a constraint primitive qicj. At first, any one subspace d0 that is intersected with the qi is found, such as, the subspace including cj. Then, a subspace that is intersected with qicj in a subspace which is adjacent to d0 is calculated. Further, starting from these subspaces, the subspace that is intersected with qicj in the adjacent subspaces is searched, and so on. The process stops until there is no any subspace that is intersected with qicj.

In order to calculate f(Dn, Qo), all Qo and the region growing method can be used. However, all visible constraint relationships at T2 are used to perform the calculation. The result is the same as the global updating scheme, but the calculation time increases as $Q_{t2}$ increases. To avoid this situation, the result of f(Dd, Qo) ∪ f(Dd, Qd) can be used to replace f(Dn, Qo). Actually, the replacement is feasible because the subspace set Dn that is added at T2 includes two parts. A part of Dn includes the subspaces that are formed by using newly added feature geometric primitives Qn as vertexes or edges. Under normal circumstance, these subspaces are not intersected with the constraint primitives corresponding to Qo. Another part of Dn includes subspaces formed by using all vertexes of Qd and the new feature geometric primitives. Therefore, the intersection relation function f(Dn, Qo) between this part of subspaces and Qo is the same as f(Dd, Qo) ∪ f(Dd, Qd). By using the calculation result at T1 and the division and marking status, the obstacle subspaces in the changed subspaces can be re-marked, thereby completing the updating of the obstacles in the environment containing the mobile robot.

It should be noted that when the 2D plane containing the mobile robot is updated, the corresponding calculation result is also updated. Therefore, the plane free subspaces and the plane obstacle subspaces need to be continuously updated based on the updated calculation result.

As mentioned earlier, the updating of the 2D plane also includes two schemes: the global updating scheme and the continuous updating scheme. The principle of the 2D plane updating is the same as the principle of the 3D space updating. The difference is that the subspaces that need to be marked in the 2D plane include irregular polygons, rectangles or squares, whereas the subspaces that need to be marked in the 3D space include irregular polyhedron subspaces, cuboid subspaces, or cube subspaces. Similarly, in the 2D plane, the constraint primitives used as marks are constituted by the 2D feature geometric primitives and the 2D positions and orientations of the visual sensor that are projected to the 2D plane; while in the 3D space, the constraint primitives used as marks are constituted by the feature geometric primitives and the positions and orientations of the visual sensor.

The visual-based obstacle detection process is described in detail in combination with FIGS. 1 to 8. In the following, visual-based obstacle detection apparatuses are described in combination with FIGS. 9 to 12. For the sake of simplicity, the basic concepts of some terminologies can refer to the explanation described in the embodiments in FIGS. 1 to 8.

Figure 9:
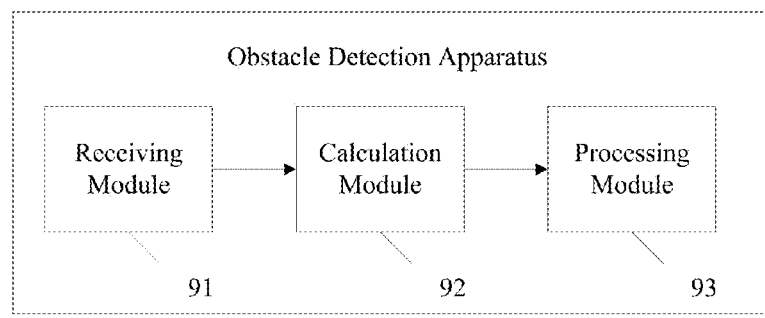
FIG. 9 illustrates a structure diagram of an exemplary visual-based obstacle detection apparatus for a mobile robot consistent with the disclosed embodiments.

FIG. 9 illustrates a structure schematic diagram of an exemplary visual-based obstacle detection apparatus for a mobile robot consistent with the disclosed embodiments. As shown in FIG. 9, the apparatus may include a receiving module 91, a calculation module 92, and a processing module 93.

The receiving module 91 may be configured to receive image information of an environment containing a mobile robot captured by at least one visual sensor to obtain one of a three-dimensional (3D) space and a two-dimensional (2D) plane. The calculation module 92 may be configured to calculate the image information received by the receiving module 91 using a Visual-SLAM algorithm to obtain a calculation result. The processing module 93 may be configured to, based on the calculation result calculated by the calculation module 92, detect obstacles in the environment containing the mobile robot.

Similar to the embodiments described above, for the apparatuses described in FIGS. 9 to 12, the type of the visual sensor used for capturing the image information is not limited. For example, the visual sensor may be a monocular camera, a binocular camera, a catadioptric omnidirectional camera, a multi-ocular omnidirectional camera, and so on. Specifically, when the visual sensor is used to capture the image information, the visual sensor can be installed on the mobile robot. The format of the image information captured by the visual sensor may be a group of continuous photos or a video.

The calculation result obtained by the calculation module 92 may include feature geometric primitives of the environment containing the mobile robot, positions and orientations of the visual sensor, as well as visible constraint relationships between the feature geometric primitives and the positions and orientations of the visual sensor.

The feature geometric primitives may include feature geometric points, as well as feature geometric points and feature geometric line segments, which can be used to represent points, points and line segments in a 3D space of the environment containing the mobile robot. That is, the feature geometric point may be a point in the 3D space, and the feature geometric line segment may be a line segment in the 3D space. In this disclosure, the feature geometric primitives may include points, and the feature geometric primitives may also include points and line segments.

The connotations and functions of the position and orientation of the visual sensor and the visible constraint relationship can refer to the embodiment shown in FIG. 1.

In this disclosure, the calculation module 92 calculates the received image information using the Visual-SLAM, and the processing module 93 can directly detect the obstacles in the environment based on the calculation result obtained by the calculation module 92. Therefore, comparing to traditional obstacle detection methods, the computation is relative simple. In addition, when the obstacles in the environment are detected based on the calculation result obtained by the calculation module 92, the mobile robot's moving space is not restricted. The obstacle detection apparatus can be applied to both 3D spatial movement and 2D planar movement.

Figure 10:
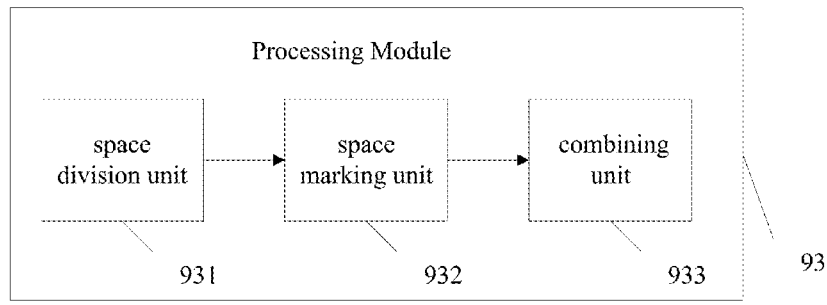
FIG. 10 illustrates a structure diagram of an exemplary processing module consistent with the disclosed embodiments.

FIG. 10 illustrates a structure schematic diagram of an exemplary processing module consistent with the disclosed embodiments. As shown in FIG. 10, the processing module 93 may include a space division unit 931, a space marking unit 932, and a combining unit 933.

The space division unit 931 may be configured to divide the 3D space of the environment containing the mobile robot into a plurality of subspaces. The space marking unit 932 may be configured to mark obstacle subspaces among the plurality of subspaces divided by the space division unit 931. Specifically, the space marking unit 932 marks the obstacle subspaces by using the feature geometric primitives and/or the visible constrain relationships obtained by the calculation module 92. The combining unit 933 may be configured to combine the obstacle subspaces marked by the marking unit 932 into an obstacle in the environment containing the mobile robot.

Because the space division unit 931 can divide the 3D space using a regular grid format and an irregular combination structure, correspondingly, the space division unit 931 may also have two types of structure. In addition, the structures of the space marking unit 932 may be also different.

Figure 11:
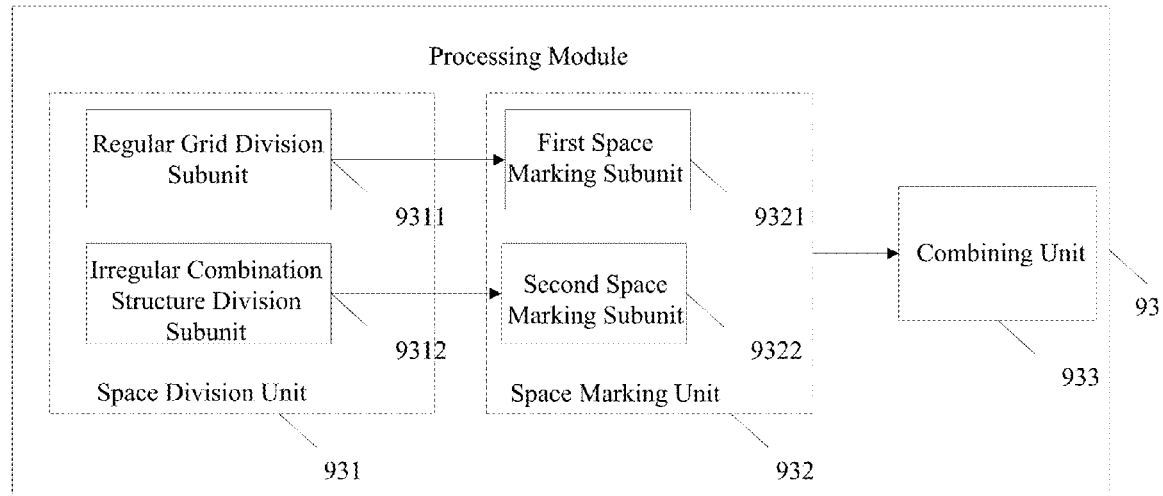
FIG. 11 illustrates a structure diagram of another exemplary processing module consistent with the disclosed embodiments.

FIG. 11 illustrates a structure schematic diagram of another exemplary processing module consistent with the disclosed embodiments. As shown in FIG. 11, the space division unit 931 may further include a regular grid division subunit 9311 and an irregular combination structure division subunit 9312. The space marking unit 932 may be further include a first space marking subunit 9321 and a second space marking subunit 9322. The functions of each subunit are described as follows.

The regular grid division subunit 9311 may be configured to divide the 3D space of the environment containing the mobile robot using one of the uniform grid structure and the self-adaptive grid structure.

Specifically, when the uniform grid structure is used to divide the 3D space, the regular grid division subunit 9311 may be configured to divide the 3D space into a plurality subspaces with a preset size, and further divide the 3D space into a plurality of subspaces with a same size, i.e., multiple cuboid subspaces and/or cube subspaces. That is, the divided 3D space can be seen as a subspace set D including multiple cuboid subspaces and/or cube subspaces. As used herein, the preset size may be a product of the average value of the positions and orientations of the visual sensor and a constant.

When the self-adaptive grid structure is used to divide the 3D space, the regular grid division subunit 9311 may be configured to divide the 3D space into a plurality of subspaces with the same size. When the size of the subspace is greater than a lower limit value of the preset size, and the divided subspace includes feature geometric primitives, the divided subspace is further divided; otherwise, the division of the subspace stops.

Specifically, when the self-adaptive grids are created, the size of the smallest subspace (the lower limit) needs to be defined. Then, based on distribution of the feature geometric primitives, the 3D space is gradually divided into a plurality of subspaces with different sizes.

Specifically, the regular grid division subunit 9311 divides the 3D space into n number of subspaces with the same size, n is an integer, such as n=2, 4, 8, and so on. For each subspace, when the size of the subspace is greater than the preset lower limit, the regular grid division subunit 9311 also determines whether the subspace includes at least one feature geometric primitive. If the subspace includes at least one feature geometric primitive, the divided subspace is further divided into n number of subspaces with the same size. If the subspace does not include at least one feature geometric primitive, the division of the subspace stops. When the size of the subspace is less than or equal to the preset lower limit, the divided subspace is not further divided, and so on. The process continues to be performed until no subspace can be divided. The divided 3D space can be seen as a subspace set D including multiple cuboid subspaces and/or cube subspaces.

When the 3D space is divided using the irregular combination structure, the irregular combination structure division subunit 9312 may be configured to divide the 3D space by using the below two structures.

When the feature geometric primitives are points, the irregular combination structure division subunit 9312 may be configured to create irregular combination structures by using the points as vertexes, and divide the 3D space into a plurality of irregular polyhedrons. That is, the divided 3D space can be seen as a subspace set D including multiple irregular polyhedrons.

When the feature geometric primitives include points and line segments, the irregular combination structure division subunit 9312 may be configured to create the irregular combination structures by using the points as vertexes and using the line segments as edges, and divide the 3D space into a plurality of irregular polyhedrons using the irregular combination structure. That is, the divided 3D space can be seen as a subspace set D including multiple irregular polyhedrons.

Because the 3D space can be divided into the subspaces using the regular grid format and the irregular combination structure, the obstacle subspaces can also be marked by using two following formats.

When the 3D space is divided into subspaces using the regular grid format, the first space marking subunit 9321 may be configured to mark the obstacle subspaces in the subspaces divided by the regular grid division subunit 9311. Specifically, the first space marking subunit 9321 marks the subspace that meets a first preset condition as the obstacle subspace. The first preset condition may include: the subspace contains any feature geometric primitives, or the subspace does not contain the feature geometric primitives and the subspace has no intersection with any constraint primitive. The constraint primitive is the primitive constituted by the feature geometric primitive and the position and orientation of the visual sensor which has the visible constraint relationship with the feature geometric primitive, details of which can refer to FIG. 7 and FIG. 8.

When the 3D space is divided into subspaces using the irregular combination structure, the second space marking subunit 9322 may be configured to mark the obstacle subspaces in the subspaces divided by the irregular combination structure division subunit 9312. Specifically, the second space marking subunit 9322 marks the subspace that meets a second preset condition as the obstacle subspace. The second preset condition may include: the subspace has no intersection with any constraint primitive, where the constraint primitive is the primitive constituted by the feature geometric primitive and the position and orientation of the visual sensor which has the visible constraint relationship with the feature geometric primitive. That is, the constraint primitive is co-determined by the feature geometric primitive and the visible constraint relationship between the feature geometric primitive and the position and orientation of the visual sensor. For example, if the feature geometric primitive is a point, the constraint primitive constituted by the point and the position and orientation of the visual sensor that has the visible constraint relationship with the point is a line segment (as shown in FIG. 7); if the feature geometric primitive is a line segment, the constraint primitive constituted by the line segment and the position and orientation of the visual sensor that has the visible constraint relationship with the line segment is a triangle (as shown in FIG. 8).

After the obstacle subspaces are marked by the first space marking subunit 9321 and the second space marking subunit 9322, the combining unit 933 combines the obstacle subspaces into an obstacle space in the 3D space containing the mobile robot. After the obstacle space and the free space are detected, the mobile robot can plan an appropriate moving path to complete autonomic movement.

Figure 12:
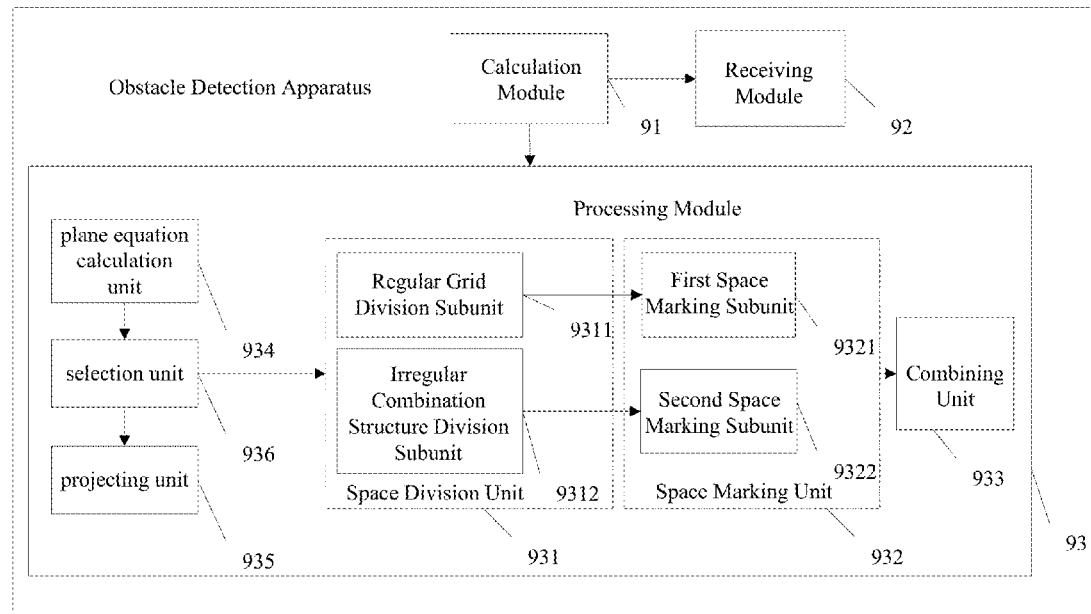
FIG. 12 illustrates a structure diagram of another exemplary visual-based obstacle detection apparatus for a mobile robot consistent with the disclosed embodiments.

When the motion of the mobile robot is limited in a 2D plane, in order to reduce computational complexity, another visual-based obstacle detection apparatus (as shown in FIG. 12) for a mobile robot may be used. This apparatus is mainly used in a scene that the mobile robot moves in a 2D plane.

FIG. 12 illustrates a structure schematic diagram of another exemplary visual-based obstacle detection apparatus for a mobile robot consistent with the disclosed embodiments. Comparing to the apparatuses shown in FIG. 9 and FIG. 10, the processing module 93 may further include a plane equation calculation unit 934, a selection unit 935 and a projecting unit 936.

When the motion of the mobile robot is limited in the 2D plane, in order to reduce computational complexity, the calculation result may be projected to the 2D plane containing the mobile robot. Before projecting the calculation result to the 2D plane containing the mobile robot, because the 2D plane containing the mobile robot is unknown, the plane equation calculation unit 934 needs to calculate the plane equations.

The plane equation calculation unit 934 may be configured to, based on feature geometric primitives and the positions and orientations of the visual sensor, calculate the 2D plane equations, such that the 2D plane on which the mobile robot moves is determined.

Specifically, based on any three positions and orientations of the visual sensor, the plane equation calculation unit 934 calculates multiple 2D plane equations. Then, the plane equation calculation unit 934 calculates sum of squared distances between all the positions and orientations of the visual sensor and the 2D plane corresponding to each calculated 2D plane equation. The process for calculating multiple 2D plane equations and calculating sum of squared distances is repeatedly performed for many times, and multiple sums of squared distances are obtained. At last, the smallest sum of squared distance is selected from the multiple sums of squared distances, and the 2D plane equation corresponding to the smallest sum of squared distance is selected as a final 2D plane equation. The method for calculating the sum of squared distance can be one of existing methods, details of which are not repeated herein.

When projecting the feature geometric primitives to the 2D plane, not all the feature geometric primitives are projected to the 2D plane. The selection unit 935 may be configured to select the feature geometric primitives to be projected.

The selection criteria of the selection unit 935 is described as follows. A component value of the feature geometric primitive in a particular direction is calculated. If the component value is greater than a preset lower threshold and less than a preset upper threshold, the feature geometric primitive is projected to the 2D plane. The particular direction may be an upward direction which is perpendicular to the 2D plane.

Specifically, at the beginning, the selection unit 935 sets a lower threshold e1 and an upper threshold e2. Then, the feature geometric primitives are selected based on e1 and e2. Assuming that k is a vector toward the sky and perpendicular to the ground, for any feature geometric primitive, component values of all vertexes on k are calculated. If the component value of at least one vertex of the feature geometric primitive on k is less than e1 or greater than e2, the feature geometric primitive is not selected. The selection of the lower threshold e1 and the upper threshold e2 can refer to the embodiments described FIG. 6.

After the feature geometric primitives to be projected are selected, the projecting unit 936 may be configured to project the feature geometric primitives to be projected and the positions and orientations of the visual sensor to the 2D plane corresponding to the 2D plane equation to obtain 2D feature geometric primitives, 2D positions and orientations of the visual sensor, and 2D visible constraint relationships. The 2D feature geometric primitive is the projection of the feature geometric primitives to be projected on the 2D plane. At the same time, because all the positions and orientations of the visual sensor are also projected to the 2D plane, the projection (also called as 2D position and orientation of the visual sensor) of the positions and orientations of the visual sensor is obtained. Correspondingly, the constraint primitives corresponding to the feature geometric primitives are projected to the 2D plane, and the visible constraint relationships (also called as 2D visible constraint relationships) between the 2D feature geometric primitives and the 2D positions and orientations of the visual sensor are further obtained. Correspondingly, the 2D constraint primitives are also obtained.

When the motion space of the mobile robot is a 2D plane, the space division unit 931 may be also configured to divide the 2D plane into multiple plane subspaces. Similar to the division of the 3D space, the space division unit 931 can divide the 2D plane using the regular grid format and the irregular combination structure.

For example, the regular grid division subunit 9311 can divide the 2D plane into multiple subspaces using the regular grid format (i.e., uniform grid structure and self-adaptive grid structure). The divided 2D place can be seen as a plane subspace set including multiple squares and/or rectangles. Similarly, the irregular combination structure division subunit 9312 can divide the 2D plane into multiple subspaces using the irregular combination structure. The divided 2D plane can be seen as a plane subspace set including multiple irregular polygons.

When the motion space of the mobile robot is the 2D plane, the space marking unit 932 may be also configured to, based on the 2D feature geometric primitives and/or the 2D constraint relationships, mark plane obstacle subspaces in the plane subspaces divided by the space division unit 931. Similarly to the division of the 3D space, the 2D plane can be divided into multiple subspaces using two methods (i.e., the regular grid format or the irregular combination structure).

When the 2D plane is divided into subspaces using the regular grid format, the first marking subunit 9321 may be configured to mark the plane obstacle subspaces in the plane subspaces divided by the regular grid division subunit 9311. Specifically, the first space marking subunit 9321 marks the plane subspace that meets a first preset condition as the plane obstacle subspace. The first preset condition may include: the plane subspace contains the 2D feature geometric primitives, or the plane subspace does not contain the 2D feature geometric primitives and the plane subspace has no intersection with any 2D constraint primitive. Otherwise, if the plane subspace is intersected with at least one 2D constraint primitive, the plane subspace is marked as a free plane subspace. The 2D constraint primitive is the primitive constituted by the 2D feature geometric primitive and the 2D position and orientation of the visual sensor which has the visible constraint relationship with the 2D feature geometric primitive When the 2D plane is divided into subspaces using the irregular combination structure, the second space marking subunit 9322 may be configured to mark the plane obstacle subspaces in the plane subspaces divided by the irregular combination structure division subunit 9312. Specifically, the second space marking subunit 9322 marks the plane subspace that meets a second preset condition as the plane obstacle subspace. The second preset condition may include: the plane subspace has no intersection with any one 2D constraint primitive, where the 2D constraint primitive is the primitive constituted by the 2D feature geometric primitive and the 2D position and orientation of the visual sensor which has the visible constraint relationship with the 2D feature geometric primitive. That is, the 2D constraint primitive is co-determined by the 2D feature geometric primitive and the visible constraint relationship between the 2D feature geometric primitive and the 2D position and orientation of the visual sensor.

When the motion of the mobile robot is only limited in the 2D plane, the calculation result is projected to the 2D plane on which the mobile robot moves, and then the 2D plane is divided and the obstacles are marked. Therefore, the obstacles in the 2D plane are detected. Comparing to the division and obstacle detection of the 3D space, the computational complexity is relatively low.

It should be noted that, under the condition of no conflict, the technical characteristics of each embodiment can be combined with each other.

In the embodiments shown in FIGS. 9-12, when the mobile robot moves, no matter the mobile robot moves in a 3D space or on a 2D plane, the environment containing the mobile robot changes all the time. Therefore, the visual-based obstacle detection process is a real-time and cyclical process. As the environment containing the mobile robot changes, the corresponding calculation result is also updated. Therefore, the updated free subspaces and the updated obstacle subspaces need to be marked based on the updated calculation result. When the updated free subspaces and the updated obstacle subspaces are marked, a global updating scheme and a continuous updating scheme may be used.

The process for the global updating scheme is described as follows. T1 and T2 are two adjacent time points. The updating does not depend on a calculation result at a previous time point T1, whereas a calculation result on a current time point T2 is directly used to re-divide and re-mark the environment containing the mobile robot, such that the updated free subspaces and the updated obstacle subspaces can be obtained and the obstacles in the environment containing the mobile robot at the current time point T2 can be detected. The amount of calculation needed by such global updating scheme increases gradually with time. Therefore, the real-time character of the method is not guaranteed.

The process for the continuous updating scheme is described as follows. T1 and T2 are two adjacent time points. A calculation result at the previous time point T1 is used for updating. A calculation result at the current time point T2 is compared to the calculation result at the previous time point T1, such that the updated calculation result at the current time point T2 and the changed subspaces are determined. The updated calculation result includes the updated feature geometric primitives, the updated positions and orientations of the visual sensor, and the updated visible constraint relationships. The changed subspaces may be subspaces with changed marking status, or subspaces with changed marking status and changed division status. When the changed subspaces are subspaces with changed marking status, based on the updated feature geometric primitives and/or the updated visible constraint relationships, the obstacle subspaces in the changed subspaces are marked again. When the changed subspaces are subspaces with changed marking status and changed division status, based on the updated feature geometric primitives and/or the updated visible constraint relationships, the changed subspaces are divided and marked again. When the continuous updating scheme is used, the needed time is basically not changed. Therefore, the real-time character of the method is ensured.

When updating, the calculation module 92 may be also configured to, when the environment containing the mobile robot changes, determine the updated calculation result and the changed subspaces based on new image information and the calculation result. The updated calculation result includes the updated feature geometric primitives, and the updated visible constrain relationships.

The processing module 93 may be further configured to, based on the updated feature geometric primitives and/or the updated visible constrain relationships, mark the obstacle subspaces in the changed subspaces again.

When the 3D space is divided using the regular grid format and the irregular combination structure, the continuous updating scheme may be different, details of which are described as follows.

1. The continuous updating scheme when the regular grid format is used to divide the 3D space.

When the uniform grid structure is used to divide the 3D space, during the moving process of the mobile robot, the divided subspaces do not change. That is, the division status of the subspaces is not changed. However, because the feature geometric primitives in the 3D space may change or increase, the visible constraint relationships may also be updated accordingly, and the marking status of the subspaces may also be changed. At this time, based on the updated feature geometric primitives and/or the updated visible constraint relationships, the obstacle subspaces in the divided subspaces are re-marked.

When the self-adaptive grid structure is used to divide the 3D space, it is assumed that T1 and T2 are two adjacent time points. From the previous time point T1 to the current time point T2, the feature geometric primitives are increased, that is, the feature geometric primitives are updated. Accordingly, the corresponding visible constraint relationships are also updated. In addition, whether the division status of the subspaces including the increased feature geometric primitives from the previous time point T1 to the current time point T2 is changed is determined. If it is determined that the division status of the subspaces is changed, the changed subspaces need to be re-divided. Because the division status of the subspaces is changed, accordingly, the marking status of the subspaces is also changed. After the changed subspaces are re-divided, based on the updated feature geometric primitives and/or the updated visible constraint relationships, the obstacle subspaces in the re-divided subspaces are re-marked.

2. The continuous updating scheme when the irregular combination structure is used to divide the 3D space.

Specifically, it is assumed that T1 and T2 are two adjacent time points. $Q_{t1}$ is a set including all feature geometric primitives obtained by using the Visual-SLAM algorithm ending at T1, and $Q_{t2}$ is a set including all feature geometric primitives obtained by using the Visual-SLAM algorithm ending at T2. Because the division status and the marking status of the 3D space at T1 are known, the division status and the marking status of the subspaces at T2 may be changed. At this time, the division status and the marking status of the subspaces may need to be updated.

It should be noted that when the 2D plane containing the mobile robot is updated, the corresponding calculation result is also updated. Therefore, the plane free subspaces and the plane obstacle subspaces need to be continuously updated based on the updated calculation result.

As mentioned above, the updating of the 2D plane also includes the global updating scheme and the continuous updating scheme. The principle of the 2D plane updating is the same as the principle of the 3D space updating. The difference is that the subspaces that need to be marked in the 2D plane include irregular polygons, rectangles or squares, whereas the subspaces that need to be marked in the 3D space include irregular polyhedron subspaces, cuboid subspaces or cube subspaces s. Similarly, in the 2D plane, the constraint primitives used as marks are constituted by the 2D feature geometric primitives and the 2D positions and orientations of the visual sensor that are projected to the 2D plane; while in the 3D space, the constraint primitives used as marks are constituted by the feature geometric primitives and the positions and orientations of the visual sensor.

Further, although the methods and apparatuses are disclosed for illustrative purposes, similar concept and approach can be applied to other display apparatus. Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

A visual-based obstacle detection method is provided. Image information of an environment containing a mobile robot captured by a visual sensor is received. The received image information is calculated using a Visual Simultaneous Localization and Mapping (Visual-SLAM) algorithm to obtain a calculation result. Based on the calculation result, the obstacles in the environment containing the mobile robot are detected. Thus, the disclosed methods and apparatuses can provide technical solutions for any suitable computer and stereo vision applications (e.g., obstacle detection in both a 2D plane and a 3D space).

What is claimed is:
1. A visual-based obstacle detection method, comprising:
   receiving image information of an environment containing a mobile robot captured by at least one visual sensor to obtain a three-dimensional (3D) space;
   based on the received image information, extracting feature geometric primitives;

based on a certain matching criteria, matching the extracted feature geometric primitives to obtain matched extracted feature geometric primitives;

reconstructing coordinates of the matched extracted feature geometric primitives and positions and orientations of the visual sensor;

optimizing the reconstructed coordinates to obtain a calculation result, wherein the calculation result includes the feature geometric primitives, the positions and orientations of the visual sensor, as well as visible constraint relationships between the feature geometric primitives and the positions and orientations of the visual sensor;

based on the obtained calculation result, detecting obstacles in the environment containing the mobile robot through dividing the 3D space of the environment containing the mobile robot into a plurality of subspaces, marking obstacle subspaces in the plurality of divided subspaces based on at least one of the feature geometric primitives, and the visible constraint relationships, and combining the obstacle subspaces into an obstacle space; and plotting a path for automatic motion of the mobile robot based on the detected obstacles.

2. The method according to claim 1, wherein dividing a 3D space of the environment containing the mobile robot into a plurality of subspaces includes:

dividing the 3D space containing the mobile robot into a plurality of subspaces using one of a regular grid format and an irregular combination structure.

3. The method according to claim 2, wherein dividing the 3D space containing the mobile robot into a plurality of subspaces using a regular grid format further includes:

when a uniform grid structure is used to divide the 3D space, dividing the 3D space into a plurality of subspaces with a preset size; and when a self-adaptive grid structure is used to divide the 3D space, dividing the 3D space into a plurality of subspaces with a same size, wherein when the size of the subspace is greater than a preset lower limit, and the divided subspace includes the feature geometric primitives, the divided subspace is further divided; otherwise, the division of the subspace stops.

4. The method according to claim 3, wherein:

the feature geometric primitives include feature geometric points, as well as feature geometric points and feature geometric line segments.

5. The method according to claim 2, wherein dividing the 3D space containing the mobile robot into a plurality of subspaces using an irregular combination structure further includes:

when the feature geometric primitives are the feature geometric points, creating the irregular combination structures using the feature geometric points as vertexes to divide the 3D space into a plurality of irregular polyhedrons; and when the feature geometric primitives include the feature geometric points and the feature geometric line segments, creating the irregular combination structures by using the feature geometric points as vertexes and using the feature geometric line segments as edges to divide the 3D space into a plurality of irregular polyhedrons.

6. The method according to claim 1, wherein marking obstacle subspaces in the plurality of divided subspaces includes:

marking the subspaces that meet a first preset condition as obstacle subspaces, wherein the first preset condition includes one of the following:

the subspace includes the feature geometric primitive; and the subspace does not include the feature geometric primitive and the subspace is not intersected with any constraint primitive, wherein the constraint primitive is the primitive constituted by the feature geometric primitive and the position and orientation of the visual sensor which has the visible constraint relationship with the feature geometric primitive.

7. The method according to claim 1, wherein marking obstacle subspaces in the plurality of divided subspaces further includes:

marking the subspaces that meet a second preset condition as obstacle subspaces, wherein the second preset condition is that the subspace is not intersected with any constraint primitive; and the constraint primitive is the primitive constituted by the feature geometric primitive and the position and orientation of the visual sensor which has the visible constraint relationship with the feature geometric primitive.

8. The method according to claim 1, when a moving space of the mobile robot is a two-dimensional (2D) plane, further including:

based on the feature geometric primitives and positions and orientations of the visual sensor, calculating a plurality of 2D plane equations;

selecting a 2D plane equation from the plurality of 2D plane equations to determine a 2D plane;

selecting the feature geometric primitives to be projected from the feature geometric primitives;

projecting the selected feature geometric primitives to be projected and the positions and orientations of the visual sensor to the 2D plane corresponding to the 2D plane equation;

obtaining 2D feature geometric primitives, 2D positions and orientations of the visual sensor, and 2D visible constraint relationships;

dividing the 2D plane into a plurality of plane subspaces; and based on at least one of the 2D feature geometric primitives and the 2D visible constraint relationships, marking 2D plane obstacle subspaces in the plurality of divided 2D plane subspaces.

9. The method according to claim 1, further including:

when the environment containing the mobile robot changes, determining an updated calculation result and the changed subspaces based on updated image information and the calculation result, wherein the updated calculation result includes updated feature geometric primitives and updated visible constraint relationships; and based on at least one of the updated feature geometric primitives and the updated visible constraint relationships, re-marking the obstacle subspaces in the changed subspaces.

10. A visual-based obstacle detection apparatus, comprising:

a receiving module configured to receive image information of an environment containing a mobile robot captured by at least one visual sensor to obtain a three-dimensional (3D) space;

a calculation module configured to calculate the image information received by the receiving module using a Visual Simultaneous Localization and Mapping (Visual-SLAM) algorithm to obtain a calculation result, wherein the calculation result includes feature geometric primitives, positions and orientations of the visual sensor, and visible constraint relationships between the feature geometric primitives and the positions and orientations of the visual sensor; and a processing module configured to, based on the obtained calculation result calculated by the calculation module, detect obstacles in the environment containing the mobile robot, wherein the processing module further includes:

a space division unit configured to divide the 3D space of the environment containing the mobile robot into a plurality of subspaces;

a space marking unit configured to, based on at least one of the feature geometric primitives and the visible constrain relationships, mark obstacle subspaces among the plurality of subspaces divided by the space division unit; and a combining unit configured to combine the obstacle subspaces marked by the marking unit into an obstacle space.

11. The apparatus according to claim 10, wherein the space 1division unit further includes:

when a uniform grid structure is used to divide the 3D space, a regular grid division subunit configured to divide the 3D space into a plurality of subspaces with a preset size; and when a self-adaptive grid structure is used to divide the 3D space, the regular grid division subunit configured to divide the 3D space into a plurality of subspaces with a same size, wherein when the size of the subspace is greater than a preset lower limit, and the divided subspace includes the feature geometric primitives, the divided subspace is further divided; otherwise, the division of the subspace stops.

12. The apparatus according to claim 10, wherein:

the feature geometric primitives include feature geometric points, as well as feature geometric points and feature geometric line segments.

13. The apparatus according to claim 10, wherein the space division unit further includes:

an irregular combination structure division subunit configured to, when the feature geometric primitives are the feature geometric points, create irregular combination structures by using the feature geometric points as vertexes, and divide the 3D space into a plurality of irregular polyhedrons; and the irregular combination structure division subunit also configured to, when the feature geometric primitives include the feature geometric points and the feature geometric line segments, create the irregular combination structures by using the feature geometric points as vertexes and using the feature geometric line segments as edges, and divide the 3D space into a plurality of irregular polyhedrons.

14. The apparatus according to claim 10, wherein the space marking unit further includes:

a first space marking subunit configured to mark the subspace that meets a first preset condition as the obstacle subspace, wherein the first preset condition includes one of the following:

the subspace contains the feature geometric primitives; and the subspace does not contain the feature geometric primitives and the subspace has no intersection with any constraint primitive, wherein the constraint primitive is the primitive constituted by the feature geometric primitive and the position and orientation of the visual sensor which has the visible constraint relationship with the feature geometric primitive.

15. The apparatus according to claim 10, wherein the space marking unit further includes:

a second space marking subunit configured to mark the subspace that meets a second preset condition as the obstacle subspace, wherein the second preset condition is that the subspace has no intersection with any constraint primitive; and the constraint primitive is the primitive constituted by the feature geometric primitive and the position and orientation of the visual sensor which has the visible constraint relationship with the feature geometric primitive.

16. The apparatus according to claim 10, wherein the processing module further includes:

a plane equation calculation unit configured to, based on the feature geometric primitives and the positions and orientations of the visual sensor, calculate 2D plane equations;

a selection unit configured to select the feature geometric primitives to be projected from the feature geometric primitives; and a projecting unit configured to project the feature geometric primitives to be projected and the positions and orientations of the visual sensor to the 2D plane corresponding to the 2D plane equation to obtain 2D feature geometric primitives, 2D positions and orientations of the visual sensor, and 2D visible constraint relationships.

17. The apparatus according to claim 10, wherein:

the space division unit is further configured to divide the 2D plane corresponding to the 2D plane equation calculated by the plane equation calculation unit into a plurality of plane subspaces; and the space marking unit is further configured to, based on at least one of the 2D feature geometric primitives and the 2D visible constraint relationships, mark the plane obstacle subspaces in the plane subspaces divided by the space division unit.

18. The apparatus according to claim 10, wherein:

the calculation unit is further configured to, when the environment containing the mobile robot changes, determine an updated calculation result and changed subspaces based on updated image information and the calculation result, wherein the updated calculation result includes updated feature geometric primitives and updated visible constraint relationships; and the processing module is further configured to, based on at least one of the updated feature geometric primitives and the updated visible constraint relationships, re-mark the obstacle subspaces in the changed subspaces.

* * * * *